Feb. 25, 1958 W. M. CATTRELL 2,824,758
FLEXIBLE HIGH TEMPERATURE HIGH PRESSURE
BALL TYPE PIPE JOINT
Filed July 18, 1955

INVENTOR.
WILLIAM M. CATTRELL
BY
Knox & Knox

United States Patent Office 2,824,758
Patented Feb. 25, 1958

2,824,758

FLEXIBLE HIGH TEMPERATURE HIGH PRESSURE BALL TYPE PIPE JOINT

William M. Cattrell, San Diego, Calif., assignor to The Ryan Aeronautical Co., San Diego, Calif., a corporation of California Application July 18, 1955, Serial No. 522,617

1 Claim. (Cl. 285—187)

The present invention relates generally to pressure sealed, ball type pipe joints, and more particularly to a high pressure high temperature ball type pipe joint.

The primary object of this invention is to provide a flexible, pressure sealed joint for high pressure, high temperature fluid transmission pipes, in which the pressure seal offers little resistance to flexing while maintaining a satisfactory seal.

Another object of this invention is to provide a satisfactory pressure seal requiring little or no adjustment during the normal service life of the joint.

Another object of this invention is to provide a joint in which the possibility of damage to the sealing element during assembly is reduced to a minimum.

Another object of this invention is to provide a joint in which an optimum uniformity of cross section presents a relatively low resistance to fluid flow.

Another object of this invention is to provide a joint which is adapted for fabrication from many different materials, so that the choice of material can be according to the dictates of availability and physical properties, the exact sizes and proportions being matters easily determined to suit particular conditions and needs.

Another object of this invention is to provide a joint which is practicable and inexpensive to manufacture.

Finally, it is an object to provide a pipe joint of the aforementioned character which is simple, convenient and which will give generally efficient and durable service.

With these and other objects definitely in view, this invention consists in the novel construction, combination and arrangement of elements and portions, as will be hereinafter fully described in the specification, particularly pointed out in the claim, and illustrated in the drawing which forms a material part of this disclosure and wherein similar characters of reference indicate similar or identical elements and portions throughout the specification and throughout the views of the drawing, and in which:

Figures 1, 2:
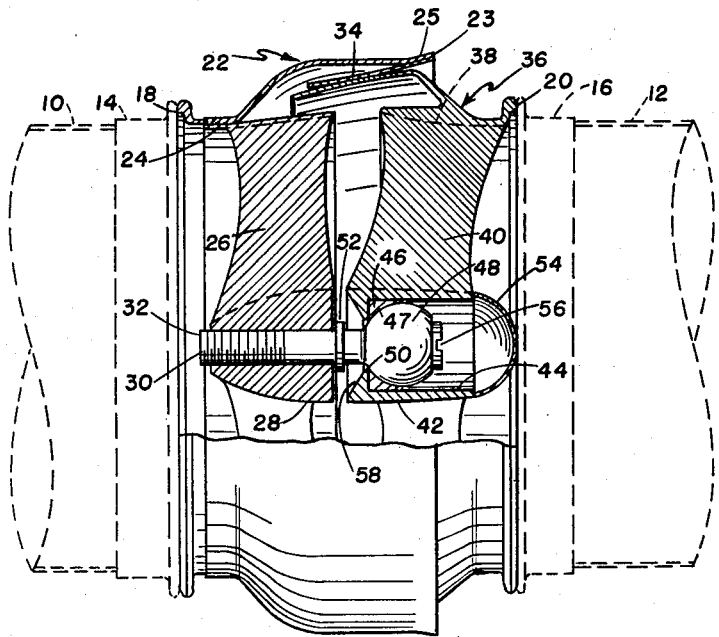
Fig. 1 is a side elevation of two pipe ends with the improved joint structure incorporated therewith.
Fig. 2 is an end elevation as viewed from the right hand side of Figure 1 with corresponding pipe end removed. The right hand portion of this figure shows ball element removed for better disclosure of details of the housing or socket element.

In Fig. 1 two adjacent pipe ends 10 and 12 are shown having conventional pipe flanges 14 and 16. One pipe flange 14 is attached and sealed in an appropriate manner to a housing flange 18. The other pipe flange 16 is attached and sealed in a similar manner to the ball element flange 20.

The housing or socket element 22 is generally cylindrical in shape and increases in diameter a slight distance from the aforementioned housing flange 18, maintaining said increased diameter to near the extremity 23 at which point it slopes slightly outward to form a conical section 25.

A support ring 24 bearing the general shape of a truncated cone, lies within said housing and is in peripheral contact with the housing at its smallest diameter, said ring 24 being the support for a spider 26, the legs of which extend radially inward to a hub 28. Said hub 28 is generally paraboloidal in cross-sectional shape, and is in axial alignment with the housing 22 and the support ring 24. The hub is provided with an axially disposed threaded opening to receive the threaded shank 30 of the ball end support pin 32.

An annulus 34 of resilient material is integral with the conical section 25 and extends inwardly from the inner periphery of the extremity 23 of said housing 22. Said annulus 34 is of frusto-conical form and lies in axial alignment and re-entrant relationship with said housing 22. The annulus 34 may be welded to the conical section 25.

The ball element 36 is of generally hollow cylindrical form at the aforementioned ball element flange 20 and maintains a fixed diameter for a short distance toward the aforementioned housing 22 and increases to a diameter slightly smaller than the minimum diameter of the conical section 25 of said housing 22. From this point, the ball element 36 assumes the shape of a section of a hollow sphere lying within said housing and having peripheral, frictional contact with the resilient annulus 34 of said housing 22 and since the annulus is frusto-conical the contact area thereof is of annular character approaching linear contact. The cylindrical portion of said ball element 36 is continued a short distance within said hollow sphere to form a support ring 38 from which the legs of a spider 40 extend radially inward to a hub 42 unitarily formed therewith. Said hub 42 is in the shape of a truncated paraboloid in axial alignment with said ball element 36 and hub 28, and is provided with a bore 44 to receive a split-collar sleeve 46. The sleeve 46 is of sufficient diameter to be pressed into the bore 44, and is provided with a bore 47 of truncated hemi-spherical proportions to receive the spherical head 48 of the ball end support pin 32, whereby a one-way thrust bearing is defined and the circle of truncation being of sufficient diameter to allow passage of the flange 52.

The ball element hub 42 is provided with a second bore 50 of a diameter to allow passage therethrough of a tightening flange 52 on the shank 30 of support pin 32. The ball element hub 42 is adapted at the end nearest the flange 20 to receive a hemi-spherical cap 54 which completes the streamlining of the assembly of hubs 28 and 42. Said cap 54 is attached in a removable manner to allow access to screw-driver slot 56 in said spherical head 48 of ball end support pin 32. At the end adjacent to hub 28, the hub 42 is provided with an internal bore of conical form, extending inwardly from the outer diameter of said hub 42 and reducing in diameter toward said bore 50.

In use, the housing 22 is attached to one pipe end and the ball element 36 is assembled and inserted into said housing 22 in the following manner: The split sleeve collar 46 is closed about the spherical head 48 of the ball end support pin 32. The shank 30 is inserted through bore 44 and through bore 50 to threadedly engage the bore of housing hub 28. The support pin 32 is then tightened by means of the screwdriver slot 56 until the flange 52 jambs against the end of hub 28. This pulls the split sleeve collar 46 into the bore 44 clamping the spherical head 48 securely, and at the same time brings the outer spherical portion of said ball element 36 into frictional contact with the aforementioned resilient annulus 34 thereby forming a pressure seal at the contact. The spherical cap 54 is then attached to the hub 42. The hub 28 and hub 42 with cap 54 in place present a streamlined shape which offers minimal resistance to fluid flow along the pipes. The pipe end 12 is then attached to the ball element flange 20, completing the assembly.

As pressures are applied to the fluid within the joint, the differential between the fluid pressure against the outer surface of the resilient ring 34 and the ambient pressure against the inner surface of said ring 34 causes a distortion which increases the contact area between said annulus 34 and spherical portion of said ball element 36, thereby increasing the effectiveness of the pressure seal.

It will be noted that the ball joint herein described is adaptable to being made of a variety of materials, the exact type and/or physical characteristics of which may be pre-determined from data on the various pressures and/or temperatures to which the joint might be subjected. For example, if the joint were to be subjected to continuous high temperatures such as 400° to 600° F., the housing 22 will be made of an alloy having a coefficient of expansion lower than that of the ball element 36, causing an increasing peripheral contact pressure between the annulus 34 and the hollow spherical portion of the ball element as the temperature rises, thereby maintaining a relatively low rate of leakage.

In the low temperature ranges, for example, −65° F. to 0° F., the housing 22 will be made of an alloy having a greater coefficient of expansion than that of the ball element 36, again preserving sufficient peripheral contact pressure between the annulus 34 and the hollow spherical portion of the ball element 36 as the temperature decreases, maintaining the relatively low rate of leakage.

Another advantage of this invention, which will now be evident in view of the foregoing description is that little resistance to flexing the joint is encountered even at either extremely high or low temperatures and pressures.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the forms of the invention disclosed herein may be made without departure from the spirit and scope of the invention, and that the specification and drawing are to be considered as merely illustrative rather than limiting.

I claim:

A flexible joint for connecting together two conduits intended to transmit fluids under pressures and temperatures above the ambient pressure and temperature, said joint comprising: a socket element having integral therewith a slightly flexible, resilient reentrant, frusto-conical metal annulus at the extremity thereof; a ball element within said socket element and comprising a portion of a hollow sphere in radially inwardly spaced relation to said socket element and in internal frictional contacting relationship with said annulus; and means for pivotally connecting said elements to maintain said relationship and comprising internal spiders in said elements, a thrust bearing connecting said spiders and positively holding said ball element from relative axial movement in one direction; said annulus constituting the sole means holding said ball element against relative movement in the opposite direction, and said sole means being positive by virtue of said annulus being metallic and having an area of contact with said ball element of limited annular character approaching linear contact, said socket element being of a material having a lower coefficient of expansion than said ball element; to give an expansion differential increasing with the operating temperature as necessary to maintain a relatively low rate of leakage.

References Cited in the file of this patent

UNITED STATES PATENTS

| Number | Name | Date |
|---|---|---|
| 386,547 | Martin | July 24, 1888 |
| 541,164 | Holland | June 18, 1895 |
| 882,836 | McLaughlin | Mar. 24, 1908 |
| 979,513 | Koenig | Dec. 27, 1910 |
| 1,526,959 | Brownell | Feb. 17, 1925 |
| 1,614,134 | Kreidel | Jan. 11, 1927 |
| 1,938,035 | Mann | Dec. 5, 1933 |
| 2,117,152 | Crosti | May 10, 1938 |
| 2,319,939 | Markey | May 25, 1943 |
| 2,465,373 | Hall | Mar. 29, 1949 |